Patented Oct. 4, 1932

1,880,918

UNITED STATES PATENT OFFICE

GEORG EBERT, FRIEDRICH AUGUST FRIES, AND PAUL GARBSCH, OF LUDWIGSHAFEN-ON-THE-RHINE, GERMANY, ASSIGNORS TO I. G. FARBENINDUSTRIE AKTIENGESELL-SCHAFT, OF FRANKFORT-ON-THE-MAIN, GERMANY

POLYMERIZATION OF DIOLEFINES

No Drawing. Application filed May 21, 1930, Serial No. 454,508, and in Germany June 22, 1929.

This invention relates to improvements in the polymerization of diolefines.

It is already known that diolefines, as for example, butadiene, isoprene or dimethyl butadiene, may be polymerized in the presence of metallic polymerizing agents, such as alkali or alkaline earth metals or their alloys with each other. In the usual process the metal is employed in the form of wire. In polymerizations on a commercial scale the employment of metal in the form of wire is not very suitable since it is difficult to manipulate and cannot be satisfactorily dispersed in the reaction chamber and reaction product. It has already been proposed to polymerize diolefines in the presence of finely dispersed, for example comminuted alkali or alkaline earth metals such as can be obtained for example by shaking the said metals in hot xylene and other inert liquids or by dissolving and reprecipitating from ammonia. A metal comminuted in this manner consists of a mixture of coarse, fine and extremely fine metal particles. Even with the employment of finely divided metals of this nature a uniform dispersion of the metal in the reaction chamber is difficult and therefore non-uniform products are sometimes formed.

We have now found that the polymerization of diolefines proceeds in a uniform and regular manner with the avoidance of the objections hereinbefore described and with the formation of uniform products by carrying out the polymerization in the presence of metallic polymerizing agents such as alkali or alkaline earth metals or their alloys in the form of particles of a uniform size. Such metals may readily be obtained in the form of particles of uniform size, for example by dispersing the metal in any manner for example by comminution in liquids the mixture of coarse, fine and extremely fine particles being then separated into fractions having well-defined uniform grain size by means of sieves in a sieve apparatus having sieves of different width of mesh. Metal particles of a definite size may also be obtained by pressing the metal, for example sodium, out from a press in the form of wire and cutting it into pieces of the same size for example by means of a mechanical device arranged in front of the mouthpiece of the nozzle. If the metal particles thus obtained are employed for the polymerization of diolefines, the polymerization proceeds very quietly and without the undesirable conglomeration and formation of lumps of the said metal. The size of the particles of metal can be varied; it is preferable to adapt the size according to the reaction conditions employed. The particles usually have a mean diameter selected from the range between about 0.1 and 1.5 millimeters. The polymerization products thus obtained are characterized in particular by a great uniformity and they are eminently suitable for further working up. The process hereinbefore described may also be carried out in the presence of solvents or diluents of liquid or gaseous nature or also in the presence of substances which favorably influence the course of the reaction such as dioxane, vinyl ethers, acetals and the like.

Any suitable temperature may be employed in the process although usually temperatures of between about 0° and 90° C. are employed.

The following examples will further illustrate the nature of this invention but the invention is not restricted to these examples. The parts are by weight.

Example 1

800 parts of butadiene with the addition of 16 parts of dioxane and in the presence of 3.2 parts of sodium in the form of small balls having a diameter of about 1.1 millimeters are subjected to polymerization at a temperature of about 40° C. in an iron autoclave which is kept in rolling motion. The polymerization proceeds quietly and uniformly, is completed in about 1 to 2½ days and yields a product which is uniform throughout, and in which the single particles of sodium, which have served as the starting point and centre of the polymerization, are uniformly dispersed. The polymerization product obtained may be excellently worked up by reason of its uniform nature.

*Example 2*

A mixture of 100 parts of butadiene and 1 part of vinyl ethyl ether is polymerized during about 1 to 2¾ days in a stirring autoclave at a temperature of about 40° centigrade with the employment of 0.4 part of sodium in the form of small balls having a diameter of about 1.1 millimeters. The reaction proceeds smoothly and uniformly and leads to a very homogeneous product in which the sodium is very uniformly dispersed and which is eminently suitable for a great variety of purposes.

*Example 3*

400 parts of butadiene with an addition of 4 parts of vinyl ethyl ether and in the presence of 1 part of pieces of sodium having a diameter of about 0.35 millimeter are caused to polymerize at a temperature of about 40° centigrade in a rotating autoclave. The polymerization proceeds quietly and smoothly and a polymerization product is obtained which is characterized by an extremely good and uniform dispension of the sodium. The polymerization product obtained may be excellently worked up by reason of its homogeneous nature.

What we claim is:—

1. A process for the production of a polymerization product of a diolefine, which comprises contacting said olefine with a metallic polymerizing agent selected from the group consisting of alkali metals, alkaline earth metals and their alloys with each other in the form of particles of a uniform size.

2. A process for the production of a polymerization product of a diolefine, which comprises contacting said olefine with an alkali metal in the form of particles of a uniform size.

3. A process for the production of a polymerization product of a diolefine, which comprises contacting said olefine with sodium in the form of particles of a uniform size.

4. A process for the production of a polymerization product of a diolefine, which comprises contacting said olefine with a metallic polymerizing agent selected from the group consisting of alkali metals, alkaline earth metals and their alloys with each other in the form of particles of a uniform size selected from the range between 0.1 and 1.5 millimeters in diameter.

5. A process for the production of a polymerization product of a diolefine, which comprises contacting said olefine with a metallic polymerizing agent selected from the group consisting of alkali metals, alkaline earth metals and their alloys with each other in the form of particles of a uniform size at temperatures of between 0° and 90° C.

6. A process for the production of a polymerization product of a diolefine, which comprises contacting said olefine with a metallic polymerizing agent selected from the group consisting of alkali metals, alkaline earth metals and their alloys with each other in the form of balls of a uniform size selected from the range between 0.1 and 1.5 millimeters in diameter.

7. A process for the production of a polymerization product of a diolefine, which comprises contacting said olefine with a metallic polymerizing agent selected from the group consisting of alkali metals, alkaline earth metals and their alloys with each other in the form of particles of a uniform size in the presence of a diluent.

8. A process for the production of a polymerization product of butadiene, which comprises contacting said butadiene with sodium in the form of balls of a uniform size of about 1 millimeter in diameter.

In testimony whereof we have hereunto set our hands.

GEORG EBERT.
FRIEDRICH AUGUST FRIES.
PAUL GARBSCH.